United States Patent
Eireiner et al.

(10) Patent No.: US 9,191,690 B2
(45) Date of Patent: Nov. 17, 2015

(54) APPARATUS AND METHOD FOR DISPLAYING MOVING IMAGES IN A MOTOR VEHICLE, AND MOTOR VEHICLE

(71) Applicant: Daimler AG, Stuttgart (DE)

(72) Inventors: Thomas Eireiner, Nersingen (DE); Ralf Hinz, Ulm (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/346,628

(22) PCT Filed: Sep. 18, 2012

(86) PCT No.: PCT/EP2012/003892
§ 371 (c)(1),
(2) Date: Mar. 21, 2014

(87) PCT Pub. No.: WO2013/041209
PCT Pub. Date: Mar. 28, 2013

(65) Prior Publication Data
US 2014/0223497 A1  Aug. 7, 2014

(30) Foreign Application Priority Data
Sep. 22, 2011 (DE) .................. 10 2011 114 059

(51) Int. Cl.
*H04N 7/18* (2006.01)
*H04N 21/414* (2011.01)
*B60K 37/06* (2006.01)

(52) U.S. Cl.
CPC .......... *H04N 21/41422* (2013.01); *B60K 37/06* (2013.01); *B60K 2350/906* (2013.01)

(58) Field of Classification Search
CPC .............. H04N 21/41422; H04N 21/2146; H04N 7/18; H04N 7/106
USPC ................. 725/75–77; 709/217–232
See application file for complete search history.

(56) References Cited

U.S. PATENT DOCUMENTS

| | | | | |
|---|---|---|---|---|
| 5,524,272 | A * | 6/1996 | Podowski et al. ............... | 725/74 |
| 5,535,314 | A * | 7/1996 | Alves et al. .................... | 382/165 |
| 6,995,755 | B2 | 2/2006 | Yamaguchi et al. | |
| 8,558,883 | B2 * | 10/2013 | Cavallaro et al. ............ | 348/135 |
| 2002/0184641 | A1 * | 12/2002 | Johnson et al. ............... | 725/105 |
| 2005/0073431 | A1 | 4/2005 | Moisel et al. | |
| 2005/0116879 | A1 | 6/2005 | Arai | |
| 2006/0011404 | A1 * | 1/2006 | Goto et al. .................... | 180/402 |

(Continued)

FOREIGN PATENT DOCUMENTS

| | | |
|---|---|---|
| DE | 103 46 511 A1 | 5/2005 |
| DE | 602 14 119 T2 | 2/2007 |
| DE | 10 2007 039 442 A1 | 2/2009 |

OTHER PUBLICATIONS

International Search Report dated Mar. 18, 2013 with English translation (five (5) pages).

(Continued)

*Primary Examiner* — Annan Shang
(74) *Attorney, Agent, or Firm* — Crowell & Moring LLP

(57) ABSTRACT

A device for displaying moving images in a motor vehicle displays moving images in a first or second mode. In the first mode the moving images are displayed with normal playback parameters and the refresh rate in the second mode is lower than in the first mode. One of the first and second modes is selected based on a speed of the motor vehicle.

15 Claims, 1 Drawing Sheet

(56) References Cited

U.S. PATENT DOCUMENTS

Figure 1:
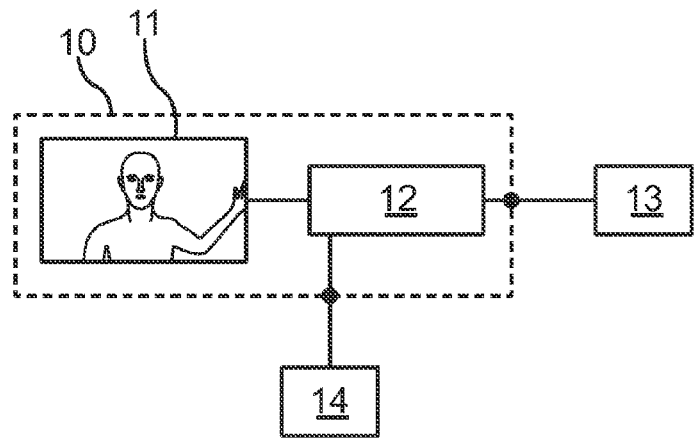

| | | | |
|---|---|---|---|
| 2007/0217501 A1* | 9/2007 | Siemens et al. | 375/240.01 |
| 2009/0265072 A1* | 10/2009 | Kondou et al. | 701/90 |
| 2010/0253918 A1* | 10/2010 | Seder et al. | 353/13 |
| 2011/0035777 A1* | 2/2011 | Chae et al. | 725/75 |
| 2011/0205162 A1 | 8/2011 | Wäller et al. | |

OTHER PUBLICATIONS

German-language Written Opinion (PCT/ISA/237) dated Mar. 18, 2013 (six (6) pages).

* cited by examiner

APPARATUS AND METHOD FOR DISPLAYING MOVING IMAGES IN A MOTOR VEHICLE, AND MOTOR VEHICLE

BACKGROUND AND SUMMARY OF THE INVENTION

Exemplary embodiments of the invention relate to a device for displaying moving images in a motor vehicle, a motor vehicle and a method for displaying moving images in a motor vehicle.

The known "COMAND" infotainment system for the passenger vehicles made by Mercedes-Benz comprises a color display, which is arranged in the center console or alongside the instrument cluster above the center console, a market-specific TV tuner (nowadays DVB-T, DTMB, ISDB-T, for example), and a DVD player. In the so-called "TV operation", television broadcasts can be displayed on the color display by the TV tuner and in the so-called "DVD video operation", films can be displayed by the DVD player. This known infotainment system has so-called "automatic image cutout", which causes the display of the moving images on the color display to be switched off when the driving speed exceeds 5 km/h and instead causes explanatory information to be shown on a black background in the color display, and causes the display of the moving images on the color display to be switched on again when the driving speed falls below 3 km/h. The risks resulting from driver distraction should hereby be reduced.

A disadvantage of this known infotainment system is that the display of the information on a black background is very dark and the abrupt change from the normal display or playback of the moving images to this dark display, and vice versa, may distract or bother the driver, such that he may often just attempt, in a traffic jam or slow-moving traffic, to adapt his driving profile to the algorithm of the automatic image cutout. This represents a driver distraction, whereby the risk of accident increases.

Exemplary embodiments of the invention are directed to further reducing the risks caused by driver distraction.

According to a first aspect of the invention a device for displaying moving images in a motor vehicle comprises
   at least one screen for displaying the moving images, to which at least one moving image source can be or is connected for the moving images;
   a control unit for the screen, which activates or can activate the screen in at least one first mode, in which the moving images are displayed with normal playback parameters, and one second mode;
wherein
   at least one speed sensor can be or is connected to the control unit, which detects or can detect the speed of the motor vehicle and transmits or can transmit it to the control unit;
   the control unit selects the first mode if the speed is less than a first threshold value;
   the control unit selects the second mode if the speed is greater than or equal to a second threshold value that is greater than or equal to the first threshold value;
   in the second mode, the refresh rate is lower than in the first mode.

The lower refresh rate leads to a lower level of driver distraction than the abrupt change to the dark image in the known "COMAND" infotainment system, and to an attractive depiction or display on the screen.

The moving image source can, according to need, be connected to the screen in any manner, for example directly or indirectly, in particular via the control unit.

The playback parameters that are used for the display and playback of the moving images comprise, for example, the refresh rate, the image resolution, color depth and brightness.

The control unit can, according to need, be formed in any way, for example in such a way that it activates or can activate the screen in at least one further mode and selects each of these further modes depending on at least one further condition, which in particular comprises a further threshold value for speed and this further threshold value being exceeded. Thus, provision can be made, for example, for the control unit to activate or be able to activate the screen in a third mode, wherein information on a dark, in particular black, screen is displayed, and selects the third mode if the speed is greater than or equal to a third threshold value that is greater than or equal to the second threshold value.

An exemplary system can also include
   at least one distance sensor to be or be able to be connected to the control unit, which detects or is able to detect the distance of the motor vehicle from an object located in front of the motor vehicle in the direction of travel and/or from a vehicle travelling in front, and transmits or is able to transmit it to the control unit;
   the control unit to change or be able to change the first and/or the second threshold value according to an isotone function of the distance.

An "isotone" function also means a "monotonically increasing" function. Since the control unit changes or can change the first and/or the second threshold value according to an isotone function of the distance, it enlarges the respective threshold value or leaves it unchanged if the distance detected by the distance sensor and transmitted to the control unit increases, and it reduces the respective threshold value or leaves it unchanged if the distance detected by the distance sensor and transmitted to the control unit decreases. This isotone change can take place, according to need, in any manner, for example in stages with at least one stage, or continuously, in particular in proportion with, disproportionately lower or disproportionately higher than the distance.

An exemplary system can further include
   at least one relative speed sensor to be or be able to be connected to the control unit, which detects or can detect the relative speed of the motor vehicle with respect to a vehicle travelling in front and transmits or can transmit it to the control unit;
   the control unit to change or be able to change the first and/or the second threshold value according to an antitone function of the relative speed.

An "antitone" function also means a "monotonically decreasing" function. Since the control unit changes or can change the first and/or the second threshold value according to an antitone function of the relative speed, it reduces the respective threshold value or leaves it unchanged if the relative speed detected by the relative speed sensor and transmitted to the control unit increases, and it enlarges the respective threshold value or leaves it unchanged if the relative speed detected by the relative speed sensor and transmitted to the control unit decreases. This antitone change can take place, according to need, in any manner, for example in stages with at least one stage, or continuously, in particular in proportion with, disproportionately lower or disproportionately higher than the relative speed.

According to a second aspect, the invention is directed to a motor vehicle comprising at least one of the exemplary devices according to the invention.

Each exemplary motor vehicle according to the invention preferably further comprises at least one speed sensor, which is connected to the control unit and detects or is able to detect the speed of the motor vehicle and transmits or is able to transmit it to the control unit.

Each exemplary motor vehicle according to the invention preferably further comprises
at least one distance sensor, which is connected to the control unit and detects or is able to detect the distance of the motor vehicle from an object located in front of the motor vehicle in the direction of travel and/or from a vehicle travelling in front, and transmits or is able to transmit it to the control unit;
wherein
the control unit changes or is able to change the first and/or the second threshold value according to an isotone function of the distance.

The distance sensor can, according to need, be formed in any way and can function, for example, with laser light and/or LIDAR and/or RADAR and/or ultrasonics.

Each exemplary motor vehicle according to the invention preferably further comprises
at least one relative speed sensor, which is connected to the control unit and detects or can detect the relative speed of the motor vehicle with respect to a vehicle travelling in front and transmits or can transmit it to the control unit;
wherein
the control unit changes or is able to change the first and/or the second threshold value according to an antitone function of the relative speed.

The relative speed sensor can, according to need, be formed in any way and can function, for example, with laser light and/or LIDAR and/or RADAR and/or ultrasonics.

Each exemplary device and each exemplary motor vehicle according to the invention preferably further comprises at least one moving image source for the moving images, which are connected to the screen, for example directly or indirectly, in particular via the control unit, and/or at least one slot for the connection of a moving image source, which is connected to the screen, for example directly or indirectly, preferably via the control unit.

The moving image source can, according to need, be formed in any manner, for example as an analogue and/or digital TV tuner, DVD player, Blu-ray player, external hard drive, flash memory card or USB stick.

In the exemplary devices and the exemplary motor vehicles according to the invention, provision can be made for
the second threshold value to be greater than the first threshold value;
the control unit to remain in the first mode if the first threshold value is reached or exceeded, and to switch from the first mode to the second mode if the second threshold value is reached or exceeded;
the control unit to remain in the second mode if the first threshold value is fallen below, and to switch from the second mode to the first mode if the first threshold value is fallen below.

The threshold values can be selected in any way according to need. Thus, for example, the first threshold value can be 3 km/h and the second threshold value can be 5 km/h.

Since the control unit only switches to the second mode when the second threshold value has been reached or exceeded, and only switches to the first mode when the first threshold value is fallen below, it selects the modes according to the type of hysteresis.

In the exemplary devices and the exemplary motor vehicles according to the invention, provision can be made for the control unit to only function in the second mode if the time span, during which the speed is greater than or equal to the second threshold value, is greater than a predetermined minimum value.

Since the control unit only functions in the second mode or switches from the first mode to the second mode after the expiry of this time span, the second mode is activated with a delay that corresponds to the minimum value. This enables a smoother journey in traffic jams and slow-moving traffic.

The minimum value can, according to need, be selected in any way and is, for example, 10 s.

In the exemplary devices and the exemplary motor vehicles according to the invention, provision can be made, in the second mode, for the control unit to change or be able to change the refresh rate according to an antitone function of the speed and/or time.

Since the control unit changes or can change the refresh rate according to an antitone function of the speed and/or time, it reduces the respective threshold value or leaves it unchanged if the speed and/or time detected by the speed sensor and transmitted to the control unit increases, and it enlarges the refresh rate or leaves it unchanged if the speed detected by the speed sensor and transmitted to the control unit decreases. This antitone change can take place, according to need, in any manner, for example in stages with at least one stage, or continuously, in particular in proportion with, disproportionately lower or disproportionately higher than the speed and/or time.

According to a third aspect, the invention is directed to a method for displaying moving images in a motor vehicle, in particular in one of the proposed motor vehicles and/or with the aid of one of the proposed devices, wherein
the moving images are displayed in at least one first mode with normal playback parameters and one second mode;
the speed of the motor vehicle is detected;
the first mode is selected if the speed is less than a first threshold value;
the second mode is selected if the speed is greater than or equal to a second threshold value that is greater than or equal to the first threshold value;
in the second mode, the refresh rate is lower than in the first mode.

Exemplary embodiments of the method can involve
the second threshold value to be greater than the first threshold value;
the first mode to remain selected if the first threshold value is reached or exceeded, and to be switched from the first mode to the second mode if the second threshold value is reached or exceeded;
the second mode remains selected if the first threshold value is fallen below, and is switched from the second mode to the first mode if the first threshold value is fallen below.

According to exemplary embodiments the moving images are only displayed in the second mode if the time span, during which the speed is greater than or equal to the second threshold value, is greater than a predetermined minimum value.

In the second mode, provision can be made for the refresh rate to be changed according to an antitone function of the speed and/or time.

According to exemplary embodiments the method can involve
detecting the distance of the motor vehicle to an object located in front of the motor vehicle in the direction of travel and/or to a vehicle travelling in front;

changing the first and/or the second threshold value according to an isotone function of the distance.

According to exemplary embodiments the method can involve detecting the relative speed of the motor vehicle to a vehicle travelling in front;

changing the first and/or the second threshold value according to an antitone function of the relative speed.

In the exemplary devices according to the invention, the motor vehicles and the methods, the refresh rate in the second mode is 0 Hz.

Then, for example, the frame of the moving images that is currently being displayed or was most recently displayed can be displayed as still or frozen image.

In the proposed devices, the proposed motor vehicles and the proposed methods, provision can be made for the image resolution and/or the color depth and/or the brightness to be smaller in the second mode than in the first mode.

The reduction in image resolution can, for example, be carried out by reducing the pixel density in the form of pixelization. The reduction in color depth can, for example, lead to a depiction of the moving images in greyscale or in black and white. The reduction in brightness can, for example, lead to a darker depiction of the moving images.

The embodiments of the inventive devices, in particular individual features of the proposed devices, apply accordingly and analogously for the inventive motor vehicles and the inventive methods. The embodiments of the inventive motor vehicles, in particular individual features of the inventive motor vehicles, apply accordingly and analogously for the inventive devices and the inventive methods. The embodiments of the inventive methods, in particular individual features of the inventive methods, apply accordingly and analogously for the inventive devices and the inventive motor vehicles.

BRIEF DESCRIPTION OF THE DRAWING FIGURES

Embodiments of the invention are illustrated in greater detail below by way of example with the aid of the appended drawings. The individual features arising herefrom are, however, not limited to the individual embodiments, but rather can be combined with individual features described above and/or with individual features of other embodiments. The details in the drawings are only illustrative, but are not to be interpreted as limiting. The reference numerals contained in the claims are not to limit the scope of protection of the invention in any way, but rather only refer to the embodiments shown in the drawings. Here are shown:

FIG. 1 a device for displaying moving images in a first embodiment; and

Figure 2:
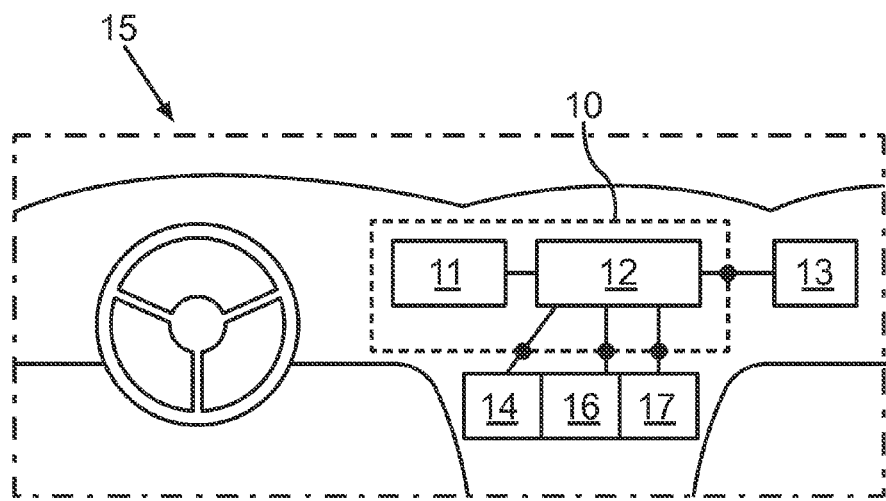

FIG. 2 a section of a motor vehicle in a preferred embodiment, having a device for displaying moving images in a second embodiment.

DETAILED DESCRIPTION

FIG. 1 schematically illustrates a first embodiment of a device 10 according to the invention for displaying moving images in a moving image. This device 10 comprises a screen 11 for displaying the moving images and a control unit 12 for the screen 11. A moving image source 13 for the moving images can be connected to the screen 11, and a speed sensor 14 can be connected to the control unit 12, which detects the speed of the motor vehicle, in which the device 10 is installed, and transmits it to the control unit 12.

As illustrated in FIG. 1 such a moving image source 13 is connected to the control unit 12 and thus to the screen 11 indirectly via the control unit 12. The moving image source 13 is formed here as a DVB-T tuner. It is further shown in FIG. 1 that such a speed sensor 14 is connected to the control unit 12.

The control unit 12 is formed in such a way that it can activate the screen 11 in a first mode, in which the moving images are displayed with normal playback parameters, and in a second mode, that it selects the first mode if the speed transmitted by the speed sensor 14 is less than a first threshold value, and that it selects the second mode if this speed is greater than or equal to a second threshold value. In this first embodiment, the second threshold value is equal to the first threshold value, which is 3 km/h, and the refresh rate, with which the moving images are played back on the screen 11, is 0 Hz in the second mode, and is thus smaller than in the first mode, in which the moving images are played back with a normal refresh rate of 60 Hz. In the second mode, the individual image from the moving images, which is currently being displayed on the screen 11 at the point in time at which the control unit 12 is switched to the second mode, is displayed on the screen as a still image, i.e. with the refresh rate of 0 Hz.

FIG. 2 schematically illustrates a preferred embodiment of a motor vehicle 15 according to the invention, which comprises a device 10 according to the invention in a second embodiment. This second embodiment resembles the first embodiment, such that only the differences are illustrated in greater detail below.

In this second embodiment, a distance sensor 16 and a relative speed sensor 17 can be connected to the control unit 12. The motor vehicle 15 further comprises a moving image source 13, which in this case has a DVB-T tuner and a DVD player, a speed sensor 14, a distance sensor 16 and a relative speed sensor 17.

It is shown in FIG. 2 that these devices 13, 14, 16, 17 are connected to the control unit 12.

In this second embodiment, the second threshold value is equal to 5 km/h and is thus greater than the first threshold value. Furthermore, the control unit 12 is formed in such a way that it remains in the first mode if the first threshold value is reached or exceeded, that it switches from the first mode to the second mode if the second threshold value is reached or exceeded, that it remains in the second mode if the second threshold value is fallen below, and that it switches from the second mode to the first mode if the first threshold value is fallen below.

In this second embodiment, the control unit 12 is furthermore formed in such a way that, in the second mode, it reduces the refresh rate to 75% of the normal refresh rate if the speed is a maximum of 10 km/h greater than the second threshold value, to 50% of the normal refresh rate if the speed is more than 10 km/h but a maximum of 20 km/h greater than the second threshold value, to 25% of the normal refresh rate if the speed is more than 20 km/h but a maximum of 30 km/h greater than the second threshold value, and to 5% of the normal refresh rate if the speed is more than 30 km/h greater than the second threshold value. The control unit thus changes the refresh rate in stages according to an antitone function of the speed.

In this second embodiment, the control unit 12 is moreover formed in such a way that it increases the first threshold value by 1 km/h and the second threshold value by 2 km/h if the distance is greater than 5 m and a maximum of 7 m, increases the first threshold value by 2 km/h and the second threshold value by 4 km/h if the distance is greater than 7 m and a maximum of 10 m, and increases the first threshold value by 3 km/h and the second threshold value by 6 km/h if the distance is greater than 10 m. The control unit 12 thus changes the first and the second threshold value in stages according to an isotone function of the distance.

In this second embodiment, the control unit 12 is additionally formed in such a way that it increases the first and the second threshold values by 5 km/h if the relative speed is negative, i.e. the motor vehicle 15 is slower than the vehicle travelling in front, does not change the first and the second threshold values if the relative speed is at least 0 km/h but maximum 2 km/h, reduces the first and the second threshold values by 1 km/h if the relative speed is greater than 2 km/h and maximum 4 km/h, and reduces the first and the second threshold values by 2 km/h if the relative speed is greater than 4 km/h. The control unit 12 thus changes the first and the second threshold value in stages according to an antitone function of the relative speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for displaying moving images in a motor vehicle, comprising:
   a moving image source;
   a screen configured to display moving images, wherein the screen is coupled to the moving image source; and
   a control unit for the screen, wherein the control unit is configured to activate the screen in first mode, in which the moving images are displayed with normal playback parameters, and one second mode,
   wherein a speed sensor connected to the control unit, wherein the speed sensor is configured to detect a speed of the motor vehicle and transmit the detected speed to the control unit,
   wherein the control unit is configured to select the first mode if the speed is less than a first threshold value,
   wherein the control unit is configured to select the second mode if the speed is greater than or equal to a second threshold value that is greater than or equal to the first threshold value,
   wherein the refresh rate is lower in the second mode than in the first mode,
   wherein a distance sensor is connected to the control unit, wherein the distance sensor is configured to detect a distance of the motor vehicle from an object located in front of the motor vehicle in a direction of travel or from a vehicle travelling in front, and to transmit the detected distance to the control unit, and
   wherein the control unit is configured to change the first or the second threshold value according to an isotone function of the distance.

2. The device of claim 1, wherein
   the second threshold value is greater than the first threshold value;
   the control unit is configured to remain in the first mode if the first threshold value is reached or exceeded, and to switch from the first mode to the second mode if the second threshold value is reached or exceeded;
   the control unit is configured to remain in the second mode if the first threshold value is fallen below, and to switch from the second mode to the first mode if the first threshold value is fallen below.

3. The device of claim 1, wherein the control unit is configured to only function in the second mode if a time span, during which the speed of the motor vehicle is greater than or equal to the second threshold value, is greater than a predetermined minimum value.

4. The device of claim 1, wherein in the second mode the control unit is configured to
   reduce the refresh rate when the speed of the motor vehicle increases, and
   increase the refresh rate when the speed of the motor vehicle decreases.

5. The device of claim 1, wherein the refresh rate in the second mode is 0 Hz.

6. The device of claim 1, wherein
   a relative speed sensor is connected to the control unit, wherein the relative speed sensor detects a relative speed of the motor vehicle with respect to a vehicle travelling in front and transmits the detected relative speed to the control unit;
   the control unit is configured to change the first or the second threshold value according to an antitone function of the detected relative speed.

7. The device of claim 1, wherein the image resolution, color depth, or brightness is smaller in the second mode than in the first mode.

8. A motor vehicle, comprising:
   a speed sensor configured to detect a speed of the motor vehicle; and
   a device for displaying moving images, comprising
      a moving image source;
      a screen configured to display moving images, wherein the screen is coupled to the moving image source; and
      a control unit for the screen, wherein the control unit is configured to activate the screen in first mode, in which the moving images are displayed with normal playback parameters, and one second mode,
   wherein the speed sensor is connected to the control unit and the speed sensor is configured to transmit the detected speed to the control unit,
   wherein the control unit is configured to select the first mode if the speed is less than a first threshold value,
   wherein the control unit is configured to select the second mode if the speed is greater than or equal to a second threshold value that is greater than or equal to the first threshold value, and
   wherein the refresh rate is lower in the second mode than in the first mode,
   wherein a distance sensor is connected to the control unit, wherein the distance sensor is configured to detect a distance of the motor vehicle from an object located in front of the motor vehicle in a direction of travel or from a vehicle travelling in front, and to transmit the detected distance to the control unit, and
   wherein the control unit is configured to change the first or the second threshold value according to an isotone function of the distance.

9. A method for displaying moving images in a motor vehicle, the method comprising:
   displaying the moving images in a first mode with normal playback parameters;
   detecting whether a speed of the motor vehicle is less than a first threshold value or greater than or equal to a second threshold value, which is greater than or equal to the first threshold value;
   continuing to display the moving images in the first mode is selected if the detected speed is less than the first threshold value;

displaying the moving images in a second mode if the detected speed is greater than or equal to the second threshold value that is greater than or equal to the first threshold value, wherein the refresh rate is lower in the second mode than in the first mode;

detecting, by a distance sensor, a distance of the motor vehicle from an object located in front of the motor vehicle in a direction of travel or from a vehicle travelling in front; and changing the first or the second threshold value according to an isotone function of the distance.

10. The method of claim 9, wherein
the second threshold value is greater than the first threshold value;
when the moving images are displayed in the first mode
the moving images are continued to be displayed in the first mode if the first threshold value is reached or exceeded, and
display of the moving images is switched from the first mode to the second mode if the second threshold value is reached or exceeded; and
when the moving images are displayed in the second mode
the moving images are continued to be displayed in the second mode if the first threshold value is fallen below, and
display of the moving images is switched from the second mode to the first mode if the first threshold value is fallen below.

11. The method of claim 9, wherein the moving images are only displayed in the second mode if a time span, during which the speed of the motor vehicle is greater than or equal to the second threshold value, is greater than a predetermined minimum value.

12. The method of claim 9, wherein in the second mode the refresh rate is
reduced when the speed of the motor vehicle increases, and increased when the speed of the motor vehicle decreases.

13. The method of claim 9, wherein the refresh rate in the second mode is 0 Hz.

14. The method of claim 9, further comprising:
detecting, by a relative speed sensor, a relative speed of the motor vehicle with respect to a vehicle travelling in front; and
changing the first or the second threshold value according to an antitone function of the detected relative speed.

15. The method of claim 9, wherein the image resolution, color depth, or brightness is smaller in the second mode than in the first mode.

* * * * *